US012073693B2

(12) United States Patent
Johnson et al.

(10) Patent No.: US 12,073,693 B2
(45) Date of Patent: Aug. 27, 2024

(54) DETECTING A SKIMMER VIA A VIBRATION SENSOR

(71) Applicant: Capital One Services, LLC, McLean, VA (US)

(72) Inventors: Molly Johnson, Alexandria, VA (US); Adam Vukich, Alexandria, VA (US); James Zarakas, Centreville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/120,825

(22) Filed: Mar. 13, 2023

(65) Prior Publication Data
US 2023/0222881 A1 Jul. 13, 2023

Related U.S. Application Data

(63) Continuation of application No. 16/936,001, filed on Jul. 22, 2020, now Pat. No. 11,625,992.

(51) Int. Cl.
G07F 19/00 (2006.01)
G06Q 10/06 (2023.01)
(Continued)

(52) U.S. Cl.
CPC ......... *G07F 19/2055* (2013.01); *G06Q 10/06* (2013.01); *G06Q 20/204* (2013.01);
(Continued)

(58) Field of Classification Search
CPC .................................................. G07F 19/2055
(Continued)

(56) References Cited

U.S. PATENT DOCUMENTS

2004/0026506 A1 2/2004 Finkelstein
2011/0276511 A1 11/2011 Rosenberg
(Continued)

OTHER PUBLICATIONS

Cao et al., "SafePay: Protecting against credit card forgery with existing magnetic card readers," 2015 IEEE Conference on Communications and Network Security (CNS), 2015, pp. 164-172, Florence, Italy.
(Continued)

*Primary Examiner* — Rafferty D Kelly
(74) *Attorney, Agent, or Firm* — Sterne, Kessler, Goldstein & Fox P.L.L.C.

(57) ABSTRACT

Disclosed herein are system, method, and apparatus for detecting a skimmer via a vibration sensor on a transaction card. The method includes receiving, at a server, from a user equipment, vibration information recorded by a transaction card in response to an execution of a transaction at a point-of-service (POS) terminal of a plurality of POS terminals using the transaction card. The vibration information may be recorded by a microphone or an accelerometer on the transaction card while the transaction card is swiped through the POS terminal or inserted into or removed from the POS terminal. The method includes determining, at the server, a state of the POS terminal based on the received vibration information and in response to a determination of the state of the POS being compromised, sending to one or more stakeholders of the transaction a warning message containing the POS terminal information including the POS terminal's state.

20 Claims, 6 Drawing Sheets

(51) Int. Cl.
*G06Q 20/20* (2012.01)
*G06Q 20/34* (2012.01)
*G06Q 20/40* (2012.01)
*G07F 7/10* (2006.01)

(52) U.S. Cl.
CPC ......... *G06Q 20/206* (2013.01); *G06Q 20/341* (2013.01); *G06Q 20/401* (2013.01); *G06Q 20/4016* (2013.01); *G07F 7/1008* (2013.01)

(58) Field of Classification Search
USPC ............................................ 235/375; 705/44
See application file for complete search history.

(56) References Cited

U.S. PATENT DOCUMENTS

| | | | |
|---|---|---|---|
| 2015/0193679 A1* | 7/2015 | Workley | G06K 19/0716 235/492 |
| 2017/0039566 A1 | 2/2017 | Schipperheijn | |
| 2017/0069176 A1 | 3/2017 | Dietz | |
| 2017/0262845 A1 | 9/2017 | Eisen | |
| 2018/0039983 A1* | 2/2018 | Eisen | G06V 40/10 |
| 2018/0314862 A1 | 11/2018 | Traynor et al. | |
| 2019/0325428 A1* | 10/2019 | Wyatt | G06Q 20/223 |
| 2022/0028228 A1 | 1/2022 | Johnson et al. | |

OTHER PUBLICATIONS

Mellen et al., "Mobile Point of Scam: Attacking the Square Reader", 2015, pp. 1-7.
International Search Report and Written Opinion of the International Searching Authority directed to related International Patent Application No. PCT/US21/42623, mailed Nov. 4, 2021; 9 pages.
Torrents, "Skimmer Tracker: Building a payment card skimmer database." In: University of Colorado Boulder, Jun. 2020, pp. 1-45, [online] < URL: https://upcommons.upc.edu/bitstream/handle/2117/328954/151876.pdf?sequence=1&isAllowed=y >.
Extended European Search Report directed to related application No. 21846710.8, dated Jun. 19, 2024, 9 pages.

* cited by examiner

DETECTING A SKIMMER VIA A VIBRATION SENSOR

CROSS-REFERENCE TO RELATED APPLICATIONS

This application is a continuation of U.S. application Ser. No. 16/936,001, filed Jul. 22, 2020, the content of which is incorporated herein in its entirety.

BACKGROUND

Credit card information of a user may be stolen when the user swipes the credit card to complete a transaction. This generally happens when the credit card is swiped through what is called a skimmer. The skimmer is a device that captures and stores details stored on the credit card's magnetic stripe. The magnetic stripe contains the credit card number, the expiration date of the credit card, and the full name of the credit cardholder. Once the data stored on the magnetic stripe of the credit card is stolen, the stolen data can be used to make a counterfeit credit card to make fraudulent charges. In most cases, by the time the user or bank issuing the credit card becomes aware of the fraudulent charges made by the counterfeit credit card, it is too late.

SUMMARY

Embodiments detect a skimmer via a vibration sensor on a smart card. In one embodiment, a method is disclosed that includes receiving, at a server, from a user equipment (UE), vibration information recorded by a transaction card in response to an execution of a transaction at a point-of-service (POS) terminal of a plurality of POS terminals using the transaction card. The vibration information may be received from the transaction card via a communication link between the transaction card and the UE. Further, a vibration sensor on the transaction card may record the vibration information while the transaction card is swiped through the POS terminal or inserted into or removed from the POS terminal. The method includes determining, at the server, a state of the POS terminal based on the received vibration information. The method further includes sending to one or more stakeholders of the transaction a warning message in response to the determination of the state of the POS terminal as being compromised. The warning message may include the state of the POS terminal and POS terminal information. In embodiments, the vibration sensor may be a microphone or an accelerometer of the transaction card.

System and user equipment embodiments are also disclosed.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Various embodiments of this disclosure will be discussed with respect to the corresponding figures.

Figure 1:
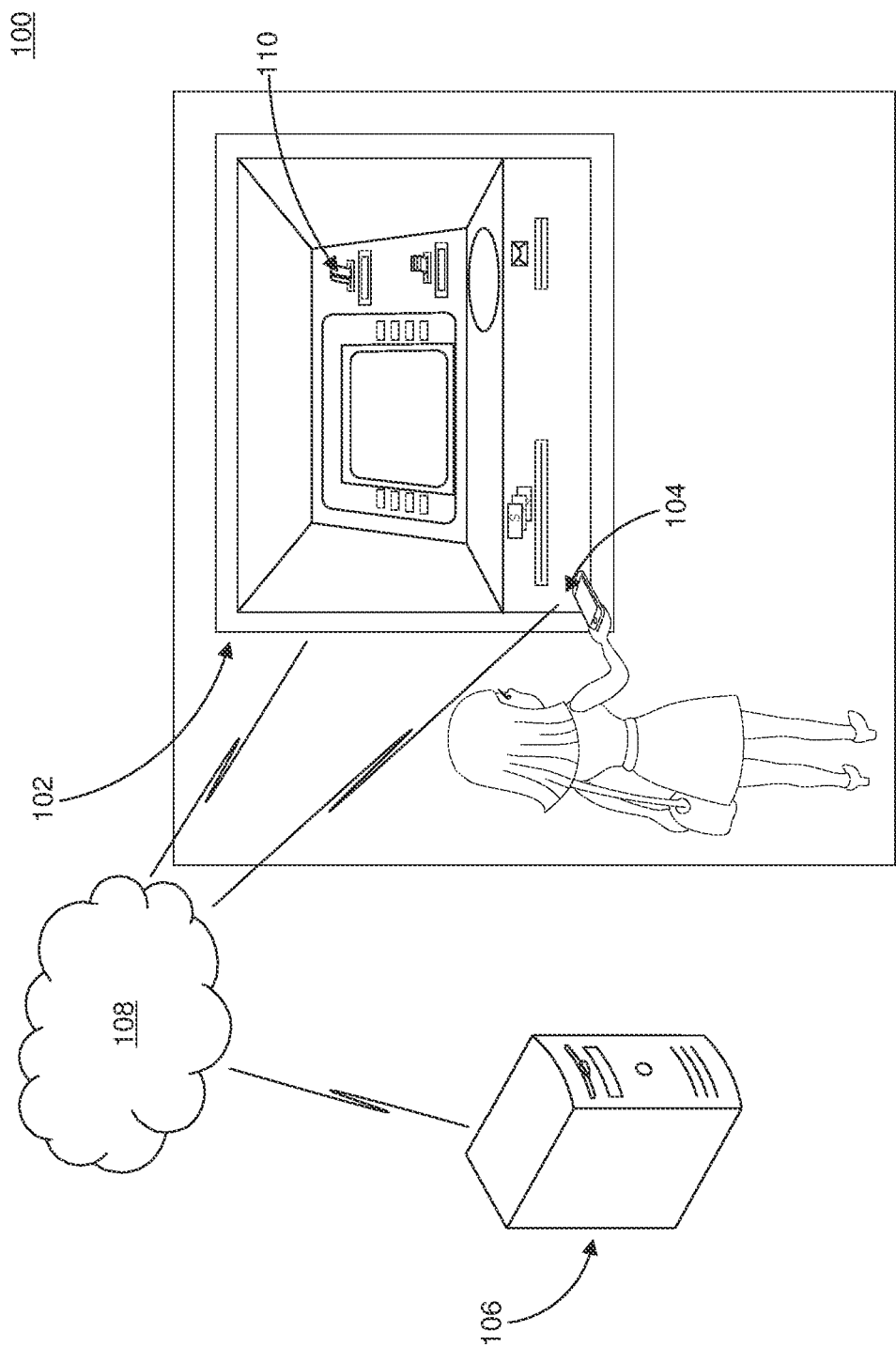
FIG. 1 illustrates an example environment, according to some embodiments.

FIG. 1 illustrates an example environment 100, in accordance with some embodiments, in which various embodiments described in this disclosure may be practiced. In FIG. 1, a point-of-sell (POS) terminal 102, a user equipment (UE) 104, and an application server 106 are shown. The UE 104, the POS terminal 102, and/or the application server 106 may be communicatively coupled to each other via a communications network 108. Even though only single instances of the application server 106, the POS terminal 102, and the UE 104 are shown in FIG. 1, there may be more than one instance of each communicatively coupled to each other via the communications network 108. Further, the application server 106 may also include a database. A transaction card 110 may be used to complete a transaction at the POS terminal 102.

In some embodiments, by way of non-limiting example, the POS terminal 102 may be an automated teller machine (ATM) terminal, or a security access terminal, etc. that enables a user to perform a transaction at the POS terminal 102 using the transaction card 110. The transaction may include, for example and without limitation, a purchase, a return, a cash withdrawal, a deposit, and/or a transfer of funds, etc.

In some embodiments, by way of non-limiting example, the transaction card 110 may be a bank-issued credit or debit card, a gift card, an automated teller machine (ATM) card, a rewards card, a client loyalty card, etc. The transaction card 110 may include a magnetic stripe and/or an integrated circuit (IC) chip that may include a transaction card number, an expiration date of the transaction card, and/or full name of the transaction cardholder.

Figure 5:
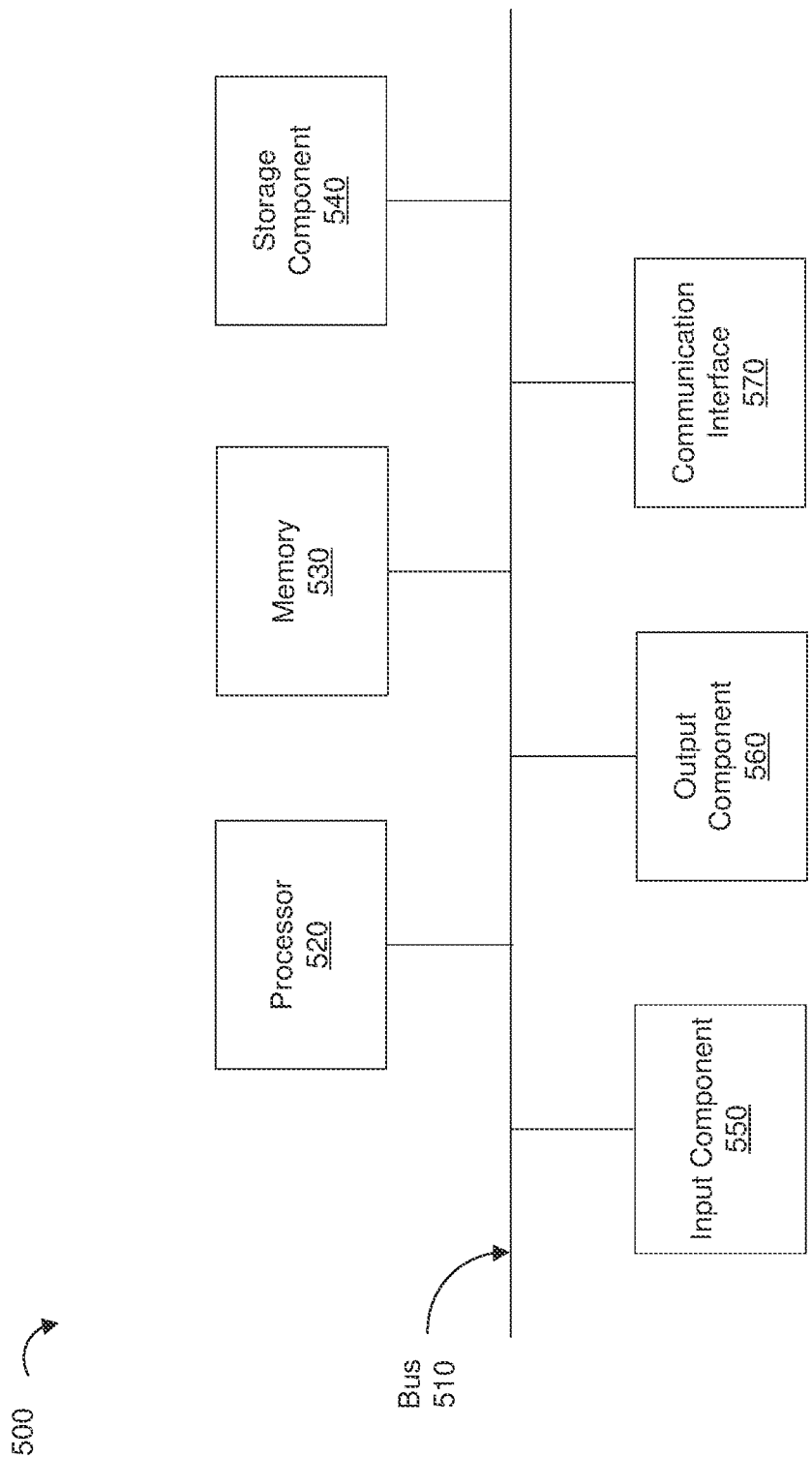
FIG. 5 is a diagram of example components of a transaction card in accordance with some embodiments.

FIG. 5 is a diagram of example components of a transaction card, such as the transaction card 110, in accordance with some embodiments. As shown in diagram 500, the transaction card 110 may include components, for example, a bus 510, a processor 520, a memory 530, a storage component 540, an input component 550, an output component 560, and a communication interface 570. The transaction card 110 may also include a battery providing power to various components of the transaction card. The transaction card 110 may also include an RF antenna coupled with the communication interface 570. The RF antenna may be used to establish a wireless communication link with the UE 104.

In accordance with some embodiments, the bus 510 may facilitate communication among the processor 520, the memory 530, the storage component 540, the input component 550, the output component 560, and the communication interface 570. The processor 520 may be a central processing unit (CPU), a microprocessor, a microcontroller, an integrated circuit (IC), a digital signal processor (DSP), a field-programmable gate array (FPGA), or an application-specific integrated circuit (ASIC), etc. The memory 530 may include a random access memory (RAM), a read-only memory (ROM), and/or another type of dynamic or static storage device, such as a flash memory, a magnetic memory, and/or an optical memory, etc. The memory 530 may store instructions to be performed by the processor 520. Configuration related data and other data may also be stored on the memory 530. The storage component 540 may also be used for storage of the data in addition to the memory 530. The input components 550 may include a touchscreen display, a microphone, a button, a switch, a keyboard, a keypad, a mouse, etc. The input components 550 may also include various sensors, such as a GPS sensor, an accelerometer, a gyroscope, and/or an actuator, etc. The output components 560 may include a display screen, a speaker, and/or a light-emitting diode (LED), etc. The communication interface 570 may be, for example, a radio frequency (RF) transceiver that may be used to establish the wireless communication link with the UE 104 using Bluetooth, Wi-Fi, and/or NFC, etc.

Returning to FIG. 1, accordingly, in some embodiments, the transaction card 110 may communicate with the UE 104 using the RF antenna over a communication link. The communication link may be established using an RF communication protocol. By way of non-limiting example, the RF communication protocol may be Bluetooth, Wi-Fi, or Near Field Communication (NFC), etc. The transaction card may also include a memory and a processor. The memory and the processor may be integrated into the IC chip. The memory may store instructions to be executed by the processor and other data.

In some embodiments, the UE 104 may be a personal computer, a laptop, a desktop, a tablet, a phone, a smartphone, a smartwatch, etc. The transaction card 110 may establish the communication with the UE 104 to communicate to the application server 106 via the communications network 108. The communications network 108 may provide secure communication between the UE 104 and the application server 106 via IPsec and/or other tunneling protocols. The communications network 108 may be a wireline and/or wireless network, that may support communication over 3G, 4G, 5G, 6G, Wi-Fi, a Local Area Network (LAN), a metropolitan area network (MAN), a wide area network (WAN), Wi-Max, a public land mobile network (PLMN), and/or a public switching telephone network (PSTN), etc. By way of non-limiting example, the UE 104 may communicate with the application server 106 via a secure hypertext transfer protocol (HTTPS) message, a hypertext transfer protocol (HTTP) message, a web service message based on a simple object access protocol (SOAP) and/or a representational state transfer (REST) architecture.

When the holder of the transaction card 110 swipes the card at the POS terminal 102, a card reader of the POS terminal 102 may retrieve information stored on the magnetic stripe of the transaction card 110. The information stored on the magnetic stripe may include the transaction card number and its expiration date, along with the name of the holder of the transaction card 110. The information retrieved by the card reader of the POS terminal 102 from the transaction card may then be used to approve or reject the transaction. To receive an approval status of the transaction, the POS terminal 102 may communicate to the application server 106 via the communications network 108. The application server 106 may include a database to authenticate the transaction card and/or approve or reject the transaction. The application server 106 may then communicate to the POS terminal 102 whether the transaction has been approved or rejected. The POS terminal 102 then either allows the transaction to proceed if the transaction has been approved or shows an appropriate message to the holder of the transaction card 110 on a display of the POS terminal 102 if the transaction has been rejected.

A skimmer is an unauthorized device that works only on the POS terminal that uses a magnetic stripe reader. When a second magnetic stripe reader is fitted in a POS terminal adjacent to a primary magnetic stripe reader, a swipe of the transaction card 110 may result in the information stored on the magnetic stripe of the transaction to both the primary and second magnetic stripe readers. Swiping of the transaction card 110 through the primary and/or second magnetic card readers of the POS terminal 102 causes the transaction card 110 and/or the magnetic stripe reader(s) to vibrate because of the friction between the surface of the transaction card and the magnetic card reader(s). The vibration may cause sound in the air surrounding the transaction card. By way of a non-limiting example, because the vibrations may be transmitted as pressure waves in the air, vibration information may be received and recorded as sound by the microphone of the transaction card 110. In another non-limiting example, because the vibrations may be transmitted through or across the material of the card itself, the vibration information may also or alternatively be recorded by the accelerometer of the transaction card. Accordingly, the microphone and/or the accelerometer of the transaction card 110 may act as a vibration sensor, as described in this disclosure.

The vibration information recorded by the vibration sensor, e.g., the microphone and/or the accelerometer of the transaction card 110, when the POS terminal 102 includes only the primary magnetic stripe reader differs from the vibration information when the POS terminal 102 also includes the second magnetic stripe reader. Accordingly, the vibration information may be used to detect the skimmer. Based on the vibration information, if the skimmer is detected, then the state of the POS terminal 102 can be determined as being compromised.

By way of a non-limiting example, in some embodiments, when the vibration information is recorded as sound waves using the microphone of the transaction card 110, a length of the time duration for which the sound is generated, two separate sounds instead of just one, and/or a frequency of sound may be considered to detect the skimmer. The sound waves recorded by the microphone of the transaction card 110 may be compared with one or more sound wave files from known compromised and/or uncompromised magnetic stripe card readers. The sound wave comparison may be performed by sound fingerprinting. Based on the result of the comparison, the state of the POS terminal 102 may be determined.

In some embodiments, the transaction card 110 may also include an accelerometer and/or a gyro sensor. Using the accelerometer and/or the gyro sensor, the processor on the transaction card may determine the intent of the holder of the transaction card 110, for example based on a certain sequence of motions. If the determined intent corresponds to the transaction card being swiped through the card reader or being inserted into the card reader, the processor may turn on the microphone on the transaction card 110. In an embodiment, the microphone is turned on for a limited duration, such as for two seconds. The microphone on the transaction card 110 may otherwise remain turned off for the privacy of the holder of the transaction card 110 and other people around him.

Accordingly, in an embodiment, the microphone is turned on as the transaction card 110 is about to be swiped through the card reader or being inserted into the card reader. The microphone then records the sound waves as the transaction card is being swiped through the card reader. The processor on the card may then store the recorded sound as audible information on the memory of the transaction card 110 before transmitting the audible information to the UE 104.

In some embodiments, in addition to or instead of the microphone, the accelerometer of the transaction card 110 may be used to detect a skimmer. The accelerometer in the transaction card 110 may detect vibrations as the card is swiped through the card reader. When the transaction card 110 is swiped through the card reader fitted with the skimmer, the vibrations detected by the accelerometer in the transaction card 110 may be different from the vibrations detected when the card reader is not fitted with the skimmer. Accordingly, vibration patterns and/or recorded sound waves may be used to detect the skimmer.

In some embodiments, the processor of the transaction card 110 initiates a wireless communication link to the UE 104. The UE 104 may be installed with an application that communicates with the transaction card 110 via the wireless communication link. The transaction card 110 may be configured to connect with the UE 104 using a specific communication protocol, such as Bluetooth, NFC, and/or Wi-Fi, etc. By way of non-limiting example, the UE 104 and the transaction card 110 both stay connected to each other via the wireless communication link for a predetermined time duration once the wireless communication link is established. In some embodiments, the predetermined time duration may be configurable. Accordingly, in some cases, the wireless communication link between the UE 104 and the transaction card 110 may not be required to be established when the transaction card 110 is being swiped.

In some embodiments, the processor of the transaction card 110 may transmit the vibration information to the UE 104 over the wireless communication link established between the UE 104 and the transaction card 110. By way of non-limiting example, the vibration information may be processed by the application running on the UE 104 or the application server 106. The processor of the transaction card 110 may process the vibration information, which, for example, may be as sound waves or vibration patterns.

However, processing of the vibration information by the processor of the transaction card 110 may quickly drain the battery on the transaction card 110. Accordingly, in some embodiments, the UE 104 transmits the vibration information received from the transaction card 110 to the application server 106 via the communications network 108 for processing of the vibration information. The application server 106 may compare the received vibration information to a plurality of vibration information samples stored in the database. The plurality of vibration information samples in the database may have been previously received by the application server 106 from a plurality of POS terminals. Each vibration information sample file of the plurality of vibration information sample files stored in the database may indicate in its metadata or as a separate database field whether the vibration information sample corresponds to a skimmer or to a non-compromised terminal. By way of non-limiting example, additional information, such as a location of the POS terminal at which the vibration information is recorded, date, and timestamp of the recording, etc., may also be stored either in the metadata of the vibration information sample or in the database. Accordingly, when the vibration information is compared with the plurality of vibration information samples stored in the database of the application server 106, the application server 106 may determine whether the vibration information matches with one or more vibration information samples that correspond to one or more skimmers. If it is determined that the vibration information corresponds to the one or more skimmers, the application server 106 may then take corrective measures, such as sending a warning message to one or more stakeholders, and/or rejecting the transaction being performed at the skimmer, etc. The one or more stakeholders may include, for example, the holder of the transaction card 110, the owner of the POS terminal 102, and/or one or more personnel at the customer care and/or fraud detection unit of the transaction card 110 issuing entity.

In some embodiments, the received vibration information may be stored at the database of the application server 106 for training a machine-learning algorithm, irrespective of whether the vibration information corresponds to the skimmer. The machine-learning algorithm may be used to determine whether the received vibration information corresponds to the skimmer.

In some embodiments, the received vibration information may be compared with previously received vibration information samples from the same location as the location of the POS terminal 102, the UE 104 or the transaction card 110 over a preconfigured time duration. The preconfigured time duration may be, for example, one week, one month, two months, or three months, etc. Accordingly, the status of the POS terminal 102 may be determined based on which previously received vibration information sample the received vibration information matches and whether or not the previously received vibration information sample corresponds to the skimmer. In some embodiments, all of the previously received vibration information samples may be associated with card readers that are not skimmers. Accordingly, when the vibration information does not match with any of the previously received plurality of vibration information samples, then it may be determined that the vibration information is from a skimmer. The vibration information may be stored in the database along with information identifying a location of the skimmer, i.e., the POS terminal 102, date and time stamp, and status as from a skimmer, etc.

In some embodiments, the UE 104 may not transmit the vibration information received from the transaction card 110 to the application server 106 but sends a request to receive one or more audio files stored in the database at the application server 106. The request from the UE 104 to the application server 106 may also include a location of the UE 104. Accordingly, the application server 106 may send one or more vibration information samples stored in the database corresponding to the location of the UE 104, i.e., the POS terminal 102, to the UE 104. The UE 104 may determine if the vibration information corresponds to a skimmer using the same or similar procedure performed by the application server 106. In addition, when the UE 104 determines that the vibration information corresponds to a skimmer, the UE 104 may notify the application server 106 to take the corrective measures as described above and transmit the vibration information received from the transaction card 110 to be stored in the database at the application server 106.

In some embodiments, the one or more vibration information samples transmitted to the UE 104, in response to the request to receiving vibration information samples stored in the database at the application server 106, may all correspond to vibration information samples not from a skimmer, from the same location as the UE 104 or the transaction card 110, i.e., the location of the POS terminal 102, or a different location. The UE 104 may then identify the vibration information received from the transaction card 110 as from a skimmer if the vibration information does not match with any of the one or more vibration information samples received from the application server 106. And, as described above, the UE 104 may notify the application server 106 to take the corrective measures described above and transmit the recorded sound received from the transaction card 110 to be stored in the database at the application server 106.

In some embodiments, by way of non-limiting example, the database may be a database in the cloud or in another server, and may not be physically located at the same location as the application server 106.

Figure 2:
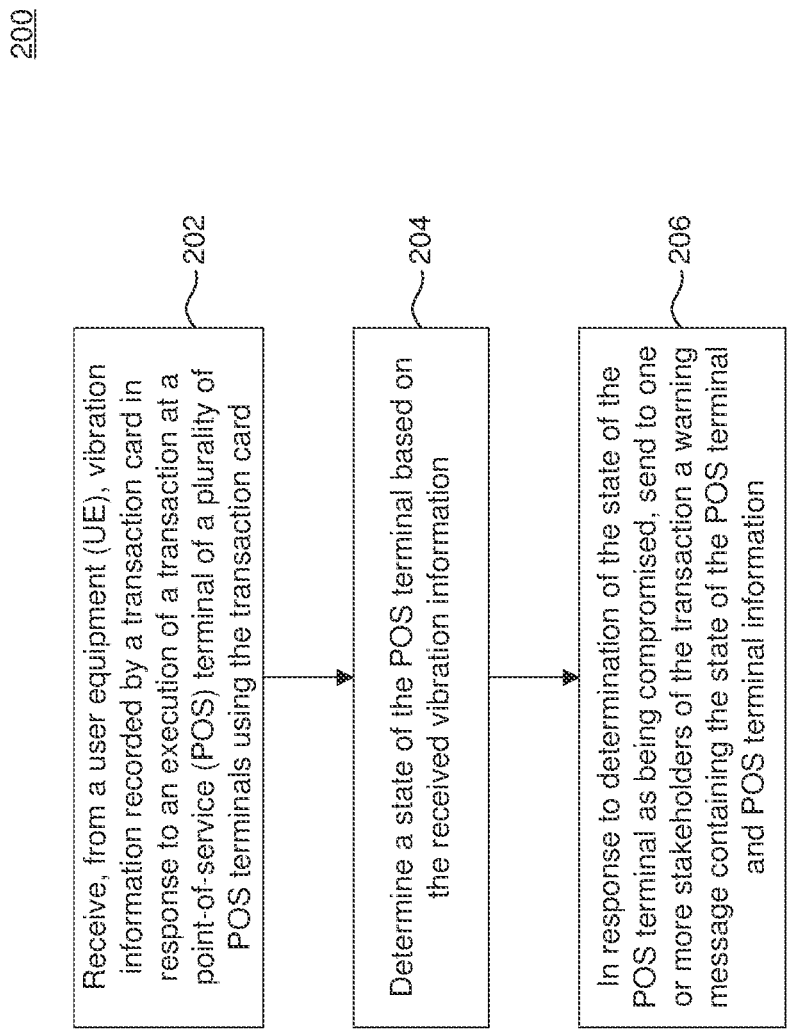
FIG. 2 is a flowchart illustrating a method for detecting a skimmer, according to some embodiments.

FIG. 2 is a flowchart illustrating a method for detecting a skimmer, according to some embodiments. An application server, such as the application server 106, may perform the method steps shown in FIG. 2. As shown in FIG. 2, at step 202, the application server 106 may receive from the UE 104 the vibration information recorded by the vibration sensor, e.g., the microphone and/or the accelerometer of the transaction card 110, while swiping the transaction card 110 into the card reader for the execution of a transaction at the POS terminal 102. The POS terminal 102 may be one of the plurality of POS terminals at the location, such as a bank, a restaurant, and/or a grocery shop, etc. As described above, along with the vibration information, the application server 106 may also receive location information corresponding to the UE 104 and/or the transaction card 110. The location of the UE 104 may be determined by the UE 104 using, for example, global positioning system (GPS) signals or multilateration of radio signals received by the UE 104 from various cell towers. The transaction card 110 may also determine the location of the transaction card using a similar method used by the UE 104.

In accordance with some embodiments, at step 204, the application server 106 may determine a state of the POS terminal 102 based on the received vibration information. As described above, the application server 106 may compare the received vibration information using a comparison technique, for example, sound fingerprinting, or machine learning algorithm with the plurality of vibration information samples stored in the database. In an embodiment, where each vibration information sample of the plurality of vibration information samples stored in the database indicates whether the vibration information sample corresponds to a skimmer, the application server may determine if the received vibration information is from a skimmer.

In accordance with some embodiments, at step 206, the application server 106 may send a warning message to the one or more stakeholders of the transaction in response to determining that the card reader of the POS terminal 102 is compromised at step 204. In addition to sending the warning message, the application server may reject the transaction being performed at the POS terminal 102.

Figure 3:
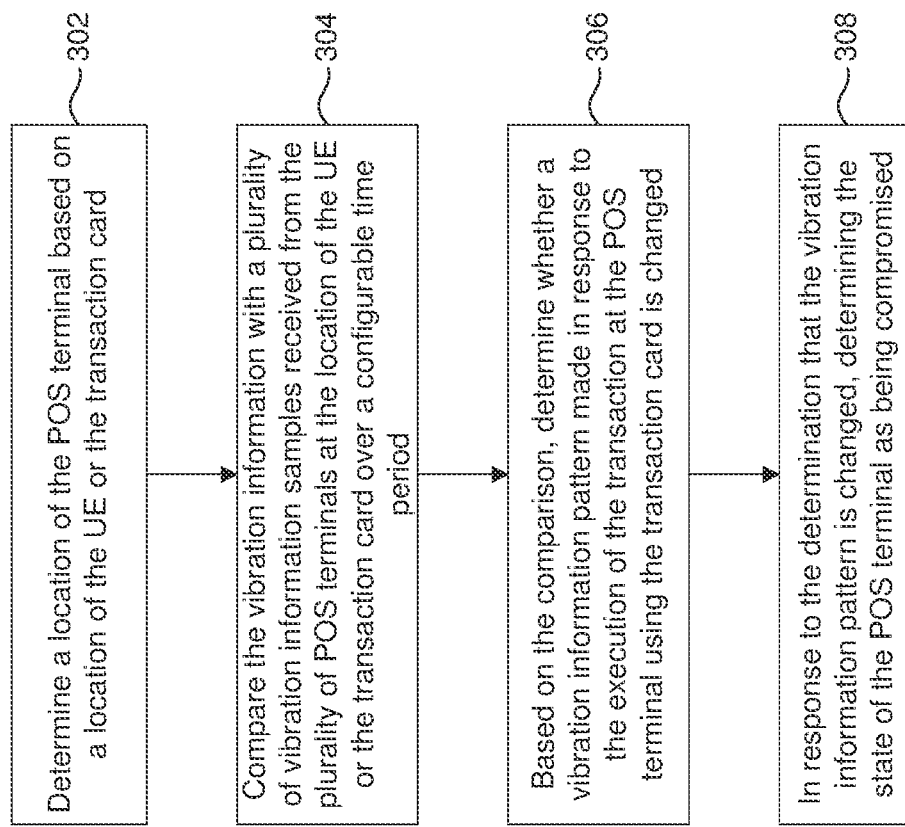
FIG. 3 is another flowchart illustrating a method for detecting a skimmer, according to some embodiments.

FIG. 3 is another flowchart illustrating a method for detecting a skimmer, according to some embodiments. At step 302, the application server 106 may determine the location of the POS terminal 102 based on the location of the UE 104 or the transaction card 110. At step 304, received vibration information is compared with a plurality of vibration information samples stored in the database and received from one or more POS terminals that share the same location as the location of the UE 104 or the transaction card 110. At step 306, it may be determined, based on the comparison, that the vibration information is different from the plurality of vibration information samples from the POS terminal(s) at the same location. At step 308, in response to the determination that the vibration information is different, the application server 106 may identify the POS terminal 102 as being compromised, and take the corrective actions as stated above.

Figure 4:
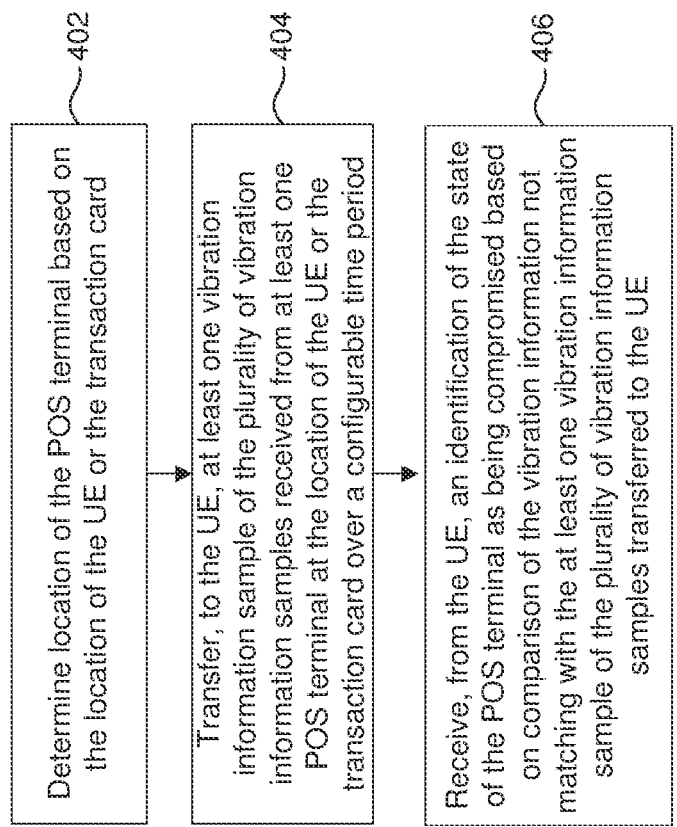
FIG. 4 is another flowchart illustrating a method for detecting a skimmer, according to some embodiments.

FIG. 4 is another flowchart illustrating a method for detecting a skimmer, according to some embodiments. At step 402, the application server 106 may determine the location of the POS terminal 102 based on the location of the UE 104 or the transaction card 110. At step 404, at least one vibration information sample of the plurality of vibration information samples received from at least one POS terminal at the location of the UE 104 or the transaction card 110 may be transferred to the UE 104. The at least one vibration information sample transferred to the UE 104 may be one of the plurality of vibration information samples received by the application server 106 over a configurable time period. At step 406, the application server may receive a notification from the UE 104 regarding the status of the POS terminal 102. The status of the POS terminal 102 may be determined as being compromised based on a comparison of the vibration information with the at least one vibration information sample and identified as not matching with the at least one vibration information sample transferred to the UE 104.

Figure 6:
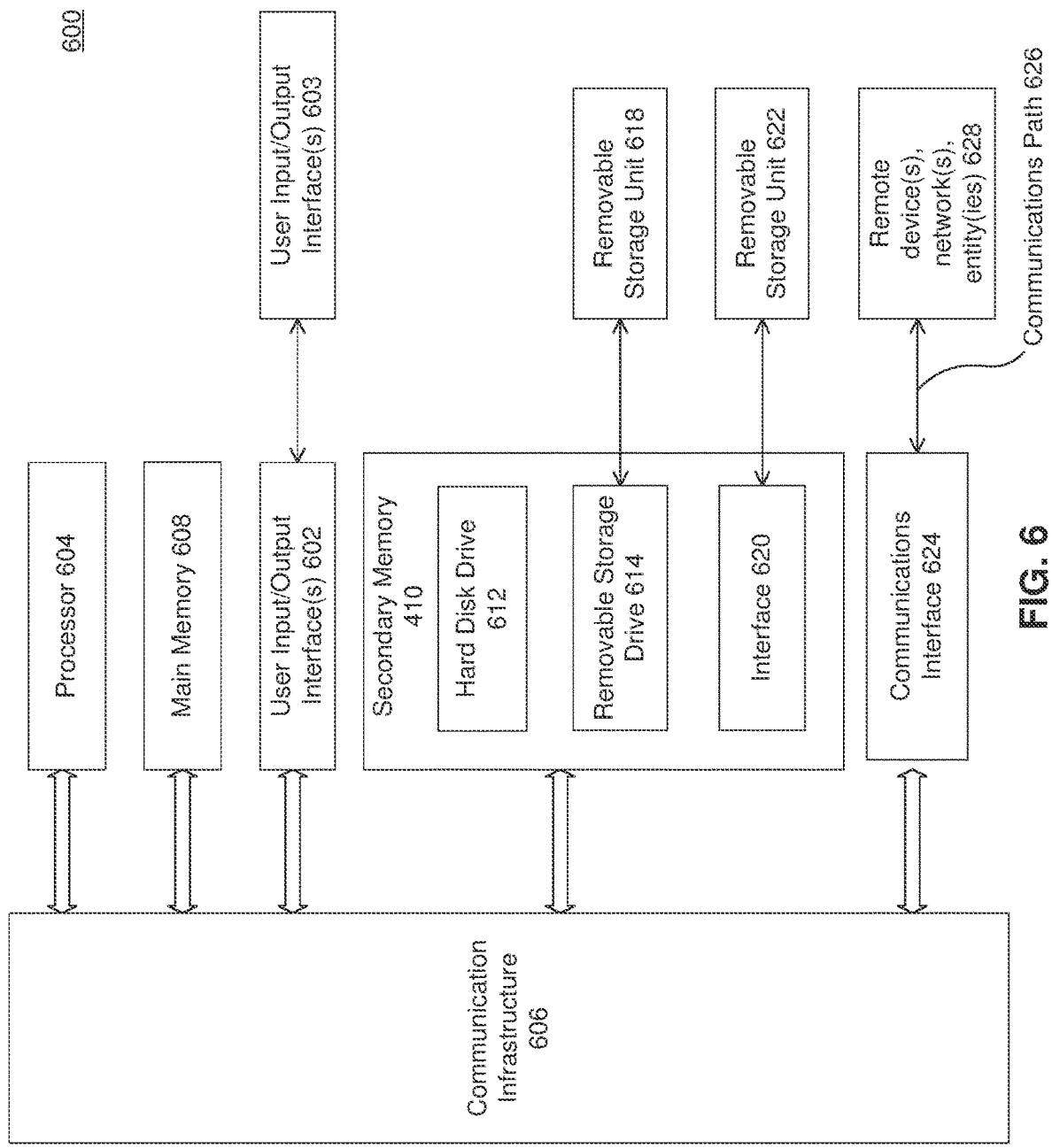
FIG. 6 illustrates an example computer system, according to some embodiments.

FIG. 6 illustrates an example computer system in accordance with some embodiments.

Various embodiments may be implemented, for example, using one or more well-known computer systems, such as a computer system 600, as shown in FIG. 6. One or more computer systems 600 may be used, for example, to implement any of the embodiments discussed herein, as well as combinations and sub-combinations thereof. The computer systems 600 may be used for the implementation of one or more embodiments described above.

The computer system 600 may include one or more processors (also called central processing units, or CPUs), such as a processor 604. The processor 604 may be connected to a communication infrastructure or bus 606.

The computer system 600 may also include user input/output device(s) 603, such as monitors, keyboards, pointing devices, etc., which may communicate with communication infrastructure 606 through user input/output interface(s) 602.

One or more processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 600 may also include a main or primary memory 608, such as random access memory (RAM). Main memory 608 may include one or more levels of cache. Main memory 608 may have stored therein control logic (i.e., computer software) and/or data.

The computer system 600 may also include one or more secondary storage devices or memory 610. The secondary memory 610 may include, for example, a hard disk drive 612 and/or a removable storage device or drive 614. The removable storage drive 614 may be a floppy disk drive, a magnetic tape drive, a compact disk drive, an optical storage device, tape backup device, and/or any other storage device or storage drive.

The removable storage drive 614 may interact with a removable storage unit 618. The removable storage unit 618 may include a computer-usable or readable storage device having stored thereon computer software (control logic) and/or data. The removable storage unit 618 may be a floppy disk, magnetic tape, compact disk, DVD, optical storage disk, and/any other computer data storage device. The removable storage drive 614 may read from and/or write to the removable storage unit 618.

The secondary memory 610 may include other means, devices, components, instrumentalities, or other approaches for allowing computer programs and/or other instructions and/or data to be accessed by the computer system 600. Such means, devices, components, instrumentalities, or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 600 may further include a communication or network interface 624. The communication interface 624 may enable the computer system 600 to communicate and interact with any combination of external devices, external networks, external entities, etc. (individually and collectively referenced by reference number 628). For example, the communication interface 624 may allow the computer system 600 to communicate with the external or remote devices 628 over communications path 626, which may be wired and/or wireless (or a combination thereof), and which may include any combination of LANs, WANs, the Internet, etc. Control logic and/or data may be transmitted to and from the computer system 600 via the communication path 626.

The computer system 600 may also be any of a personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 600, the main memory 608, the secondary memory 610, and the removable storage units 618 and 622, as well as tangible articles of manufacture embodying any combination of the foregoing. Such control logic, when executed by one or more data processing devices (such as the computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A method, comprising:
receiving, at a server, from a transaction card via a user equipment (UE) and via a communication link between the transaction card and the UE, vibration information recorded by the transaction card in response to an execution of a transaction at a point-of-service (POS) terminal of a plurality of POS terminals using the transaction card, the vibration information caused by friction between the transaction card and the POS terminal as the transaction card interacts with the POS terminal;
determining, at the server, a state of the POS terminal based on the vibration information, the state of the POS terminal comprising whether a skimmer is detected; and
in response to determination of the state of the POS terminal as being compromised, sending to one or more stakeholders of the transaction a warning message containing the state of the POS terminal and POS terminal information.

2. The method of claim 1, wherein the vibration information is recorded as sound by a microphone on the transaction card, wherein the state of the POS terminal is determined based on at least one of a duration of the sound, whether the sound comprises two separate sounds, or a frequency of the sound.

3. The method of claim 1, wherein the vibration information is recorded by an accelerometer on the transaction card while the transaction card is swiped through the POS terminal or inserted into or removed from the POS terminal.

4. The method of claim 1, wherein the vibration information is received from the transaction card via a communication link between the transaction card and UE.

5. The method of claim 1, wherein the communication link is established using a radio frequency communication protocol comprising one of Bluetooth, Wi-Fi, or Near Field Communication (NFC).

6. The method of claim 1, further comprising:
storing, at a database of the server, the received vibration information and associated POS terminal information for comparison of the received vibration information with a plurality of vibration information samples or training a machine learning algorithm,
wherein the associated POS terminal information comprises a location of the POS terminal.

7. The method of claim 1, wherein the determining the state of the POS terminal further comprises:
comparing the vibration information with at least one vibration information sample corresponding to at least one compromised POS terminal; and
based on the comparison matching the vibration information to a vibration information sample of the at least one vibration information sample corresponding to at least one compromised POS terminal, determining the state of the POS terminal as being compromised.

8. The method of claim 1, wherein the determining the state of the POS terminal further comprises:
determining a location of the POS terminal based on a location of the UE or the transaction card;
comparing the vibration information with a plurality of vibration information samples corresponding to at least one POS terminal at the location of the UE or the transaction card over a configurable time period;
based on the comparison, determining whether a vibration pattern in response to the execution of the transaction at the POS terminal using the transaction card is changed; and
in response to the determination that the vibration pattern is changed, determining the state of the POS terminal as being compromised.

9. The method of claim 1, wherein the determining the state of the POS terminal further comprises:
determining a location of the POS terminal based on a location of the UE or the transaction card;
transferring, to the UE, at least one vibration information sample of a plurality of vibration information samples corresponding at least one POS terminal at the location of the UE or the transaction card over a configurable time period; and
receiving, from the UE, an identification of the state of the POS terminal as being compromised based on comparison of the vibration information not matching with the at least one vibration information sample transferred to the UE.

10. A system, comprising:
a memory; and
a processor, communicatively coupled to the memory, configured to perform operations stored in the memory, the operations comprising:
receiving, from a user equipment (UE), vibration information recorded by a transaction card in response to an execution of a transaction at a point-of-service (POS) terminal of a plurality of POS terminals using the transaction card and transmitted by the transaction card to the UE over a communication link, the vibration information caused by friction between the transaction card and the POS terminal as the transaction card interacts with the POS terminal;
determining a state of the POS terminal based on the vibration information, the state of the POS terminal comprising whether a skimmer is detected; and
in response to determination of the state of the POS terminal as being compromised, sending to one or more stakeholders of the transaction a warning message containing the state of the POS terminal and POS terminal information.

11. The system of claim 10, wherein the vibration information is recorded by a microphone or an accelerometer on the transaction card while the transaction card is swiped through the POS terminal or inserted into or removed from the POS terminal.

12. The system of claim 10,
wherein the communication link is established using a radio frequency communication protocol comprising one of Bluetooth, Wi-Fi, or Near Field Communication (NFC).

13. The system of claim 10, wherein the operations further comprise:
storing the received vibration information and associated POS terminal information into a database in the memory for comparison of the received vibration information with a plurality of vibration information samples or training a machine learning algorithm,
wherein the associated POS terminal information comprises a location of the POS terminal.

14. The system of claim 10, wherein the operations further comprise determining the state of the POS terminal by:
comparing the vibration information with at least one vibration information samples corresponding to at least one compromised POS terminal; and
based on the comparison matching the vibration information to a vibration information sample of the at least one vibration information sample corresponding to at least one compromised POS terminal, determining the state of the POS terminal as being compromised.

15. The system of claim 10, wherein the operations further comprise determining the state of the POS terminal by:
determining a location of the POS terminal based on a location of the UE or the transaction card;
comparing the vibration information with a plurality of vibration information samples corresponding to at least one POS terminal at the location of the UE or the transaction card over a configurable time period;
based on the comparison, determining whether a vibration pattern made in response to the execution of the transaction at the POS terminal using the transaction card is changed; and
in response to the determination that the vibration pattern made in response to the execution of the transaction at the POS terminal is changed, determining the state of the POS terminal being as compromised.

16. The system of claim 10, wherein the operations further comprise determining the state of the POS terminal by:
determining a location of the POS terminal based on a location of the UE or the transaction card;

transferring, to the UE, at least one vibration information sample of a plurality of vibration information samples corresponding to at least one POS terminal at the location of the UE or the transaction card over a configurable time period; and receiving, from the UE, an identification of the state of the POS terminal as being compromised based on comparison of the vibration information not matching with the at least one vibration information sample transferred to the UE.

17. A user equipment (UE), comprising:

a memory; and a processor, communicatively coupled to the memory, configured to perform operations stored in the memory, the operations comprising:

receiving, from a transaction card, vibration information recorded by the transaction card in response to an execution of a transaction using the transaction card at a point-of-service (POS) terminal of a plurality of POS terminals, the vibration information caused by friction between the transaction card and the POS terminal as the transaction card interacts with the POS terminal;

determining a state of the POS terminal based on the received vibration information, the state of the POS terminal comprising whether a skimmer is detected; and in response to determination of the state of the POS terminal as being compromised, taking an action that prevents a fraudulent use of the transaction card, wherein the action comprises sending a warning message comprising the state of the POS terminal, and POS terminal information to one or more stakeholders of the transaction.

18. The UE of claim 17, wherein the vibration information is recorded by a microphone or an accelerometer on the transaction card while the transaction card is swiped through the POS terminal or inserted into or removed from the POS terminal.

19. The UE of claim 17, wherein the vibration information is received from the transaction card via a communication link established using a radio frequency communication protocol comprising one of Bluetooth, Wi-Fi, or Near Field Communication (NFC).

20. The UE of claim 17, wherein the operations further comprise determining the state of the POS terminal by:

comparing the vibration information with at least one vibration information sample corresponding to at least one compromised POS terminal; and based on the comparison matching the vibration information to a vibration information sample of the at least one vibration information samples corresponding to at least one compromised POS terminal, determining the state of the POS terminal as being compromised.

* * * * *